March 16, 1965 W. B. RODGER 3,173,560
SKIP UNLOADING APPARATUS
Filed April 6, 1962 2 Sheets-Sheet 1
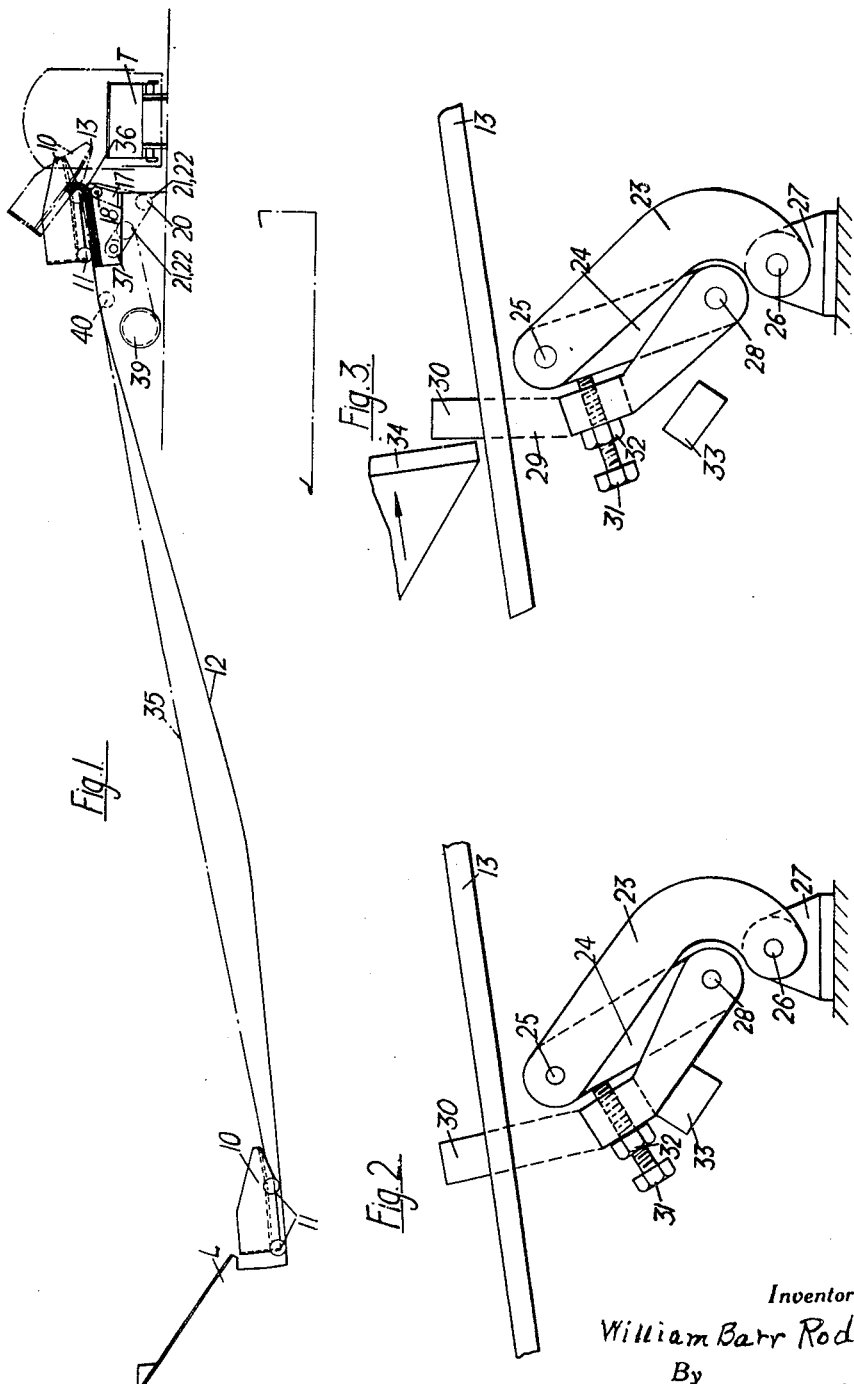
Inventor
William Barr Rodger
By
Stevens, Davis, Miller & Mosher
Attorneys March 16, 1965  W. B. RODGER  3,173,560
SKIP UNLOADING APPARATUS Filed April 6, 1962  2 Sheets-Sheet 2

Inventor
William Barr Rodger
By
Stevens, Davis, Miller & Mosher
Attorneys

United States Patent Office 3,173,560
Patented Mar. 16, 1965

3,173,560
SKIP UNLOADING APPARATUS
William Barr Rodger, Corby, England, assignor to Stewarts and Lloyds Limited, Glasgow, Scotland
Filed Apr. 6, 1962, Ser. No. 185,590
Claims priority, application Great Britain, Apr. 28, 1961, 15,480/61
3 Claims. (Cl. 214—104)

This invention relates to apparatus for unloading or discharging the contents of loaded skips (by which term where used hereinafter and in the claims is to be construed rail-borne vehicles having a load-carrying body).

The present invention is apparatus for unloading a wheeled skip, said apparatus comprising a carriage having an upper surface, a front end and a rear end, brackets spaced apart transversely of said carriage and below same, at least two plates depending from said carriage and spaced apart transversely of the latter, said plates having openings aligned along an axis extending transversely below said carriage and at said rear end of the latter, an axle passing freely through said openings and secured to said brackets, a track mounted along said upper surface of said carriage, means adapted to tilt said carriage about said axle between a skip-receiving position, wherein said track is aligned with a track along which said skip is adapted to be progressed from a loading position, and a skip-unloading position, wherein said skip is on said carriage track and is adapted to be tilted with said carriage to discharge the skip load, said carriage track being curved upwardly and reversely at said rear end of said carriage to receive the leading wheels of said skip when the latter arrives on said carriage, and toggle catch means locking the carriage in the skip-receiving position and adapted to be tripped by the skip arriving on the carriage to permit tilting of the carriage with the skip thereon in the direction opening the carriage track upwardly away from the skip track about said axis to a skip-discharging position.

An embodiment of the invention will now be described, by way of example, with reference to the accompanying drawings, in which:

FIG. 1 is a diagrammatic illustration in side elevation of progress of a skip between loading and unloading positions and being unloaded at the latter position by apparatus in accordance with the present invention; and FIG. 2 is a diagrammatic illustration in side elevation of the toggle catch means when these means are in a position locking the tiltable carriage in position to receive the loaded skip.

FIG. 3 is a diagrammatic illustration in side elevation of the toggle catch means showing the catch means still locking the carriage in position but being moved toward the unlocked position by the arrival of the skip.

Referring now to FIG. 1, a skip 10 has running wheels 11 through the medium of which it is adapted to be progressed along a track 12 to and from a loading position L and a tilting carriage 13 from which it is automatically unloaded or discharged, for example into a truck T. The tilting carriage 13 is inclined at an angle of 8° or thereabouts to the horizontal, sloping downwardly in the direction of aproach of the skip. It has been found convenient that the track 12 should incline gently upwardly initially at an angle of 5° or thereabouts from the unloading position, merge into a steeper upward incline of 16° or thereabouts an then merge into a lesser upwards incline of said angle of 8° or thereabouts on its approach to the carriage 13.

Figure 4:
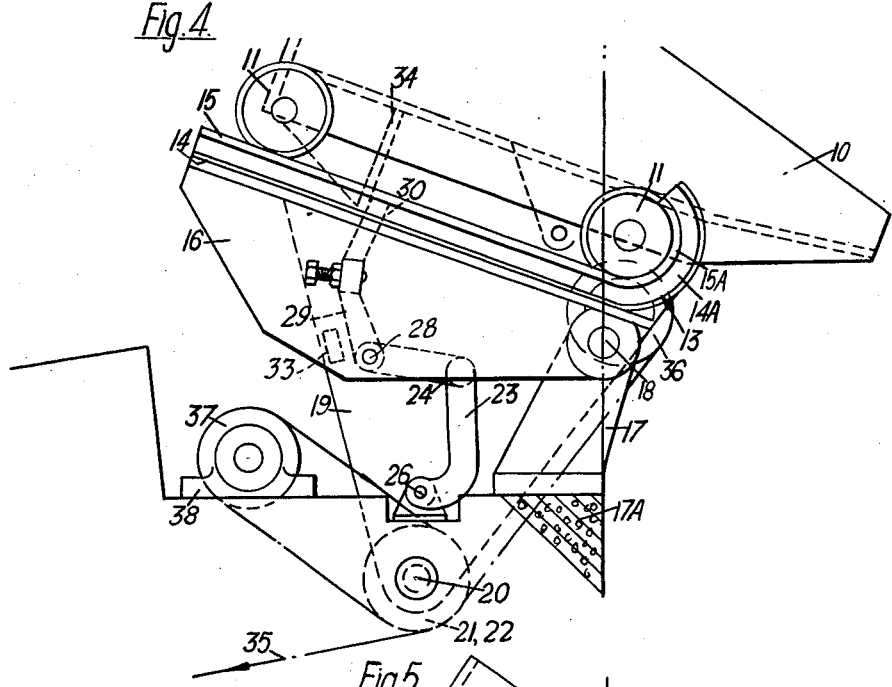
FIG. 4 is a diagrammatic illustration in side elevation of the toggle catch means after complete unlocking and the skip in a partial unloading position.

The tilting carriage 13 (see FIGS. 3 and 4) comprises a flat-surfaced platform 14 having mounted thereon rails 15 which are aligned with the rails of the track 12 when the carriage is in position to receive a skip moving theretowards along the track 12 (hereinafter referred to as the "rest position" of the carriage). The platform 14 has an upwardly turned end 14A which is substantially semi-circular and presents its concavity towards an incoming skip. The rails 15 follow the curvature of the end 14A as shown at 15A and the curved portions 15A are a snug fit about parts of the circumferences of the leading wheels 11 of an incoming skip.

The carriage is mounted for tilting in the following manner. Vertical plates 16 depend from the platform at each longitudinal side of the latter. Vertical brackets 17, set in concrete foundations 17A, mount therebetween a horizontal axle 18 which passes through the plates 16, and thus supports the carriage 13 for tilting movement about the axle 18. Other vertical plates 19, triangular in shape, also depend from the platform and are also freely penetrated by the axle 18. The plates 19 are much longer than the plates 16 and mount therebetween at their lower ends a horizontal axle 20 on which are mounted, centrally intermediate the two plates 19, twin pulleys 21 and 22 which are free to rotate about the axle 20.

The carriage 13 is locked in the rest position and the means so locking same is adapted to be tripped by an incoming skip 10 to release the carriage 13 for tilting movement about the axle 18. The carriage-locking means (FIG. 2) comprises, at each side of the carriage, a toggle catch consisting of two levers 23, 24 hinged together at 25, the lever 23 being pivotally secured at 26 to a fixed abutment 27, and the lever 24 being pivotally secured at 28 to the appropriate one of the triangular plates 19 depending from the platform 14 of the carriage 13. A striker bar 29 is also pivoted at 28 with its free end 30 projecting above the carriage. Each of the bars 29 is adjustable relative to the lever 24, to adjust the spacing between the bar and the lever by means of a screwed bolt 31 passing through a tapped opening in the bar and locked by a lock nut 32. Stop brackets 33 mounted on the plates 19 hold the striker bars 29 in the rest position of the carriage 13. A striker 34 is mounted in an underslung position on the skip 10.

The skip 10 is adapted to be hauled up the inclined track 12 by a wire rope 35 anchored at one end to the skip and at the other end secured to a winch 39 after passing through a pulley system located at the unloading end of the track 12. The pulley system employed in this invention comprises twin first and second loose pulleys 21 and 22 mounted centrally intermediate of plates 19 at the apex thereof, a third loose pulley 36 mounted between said plates below platform end 14A, and a fourth loose pulley 37 mounted on a fixed abutment 38, the winch rope passing from the winch successively around the second 22, fourth 37, first 21 and third 36 loose pulleys to the skip-coupling position. The rope 35 from the skip passes over a jockey pulley 40 and then over loose pulley 36 mounted between the plates 19, down to loose pulley 21 and thence to a loose pulley 37 mounted on a fixed abutment 38. After passing around pulley 37, the rope 35 passes around loose pulley 22 and thence passes to a winch drum 39. The jockey pulley 40 maintains the rope 35 in correct position relative to the carriage.

Figure 5:
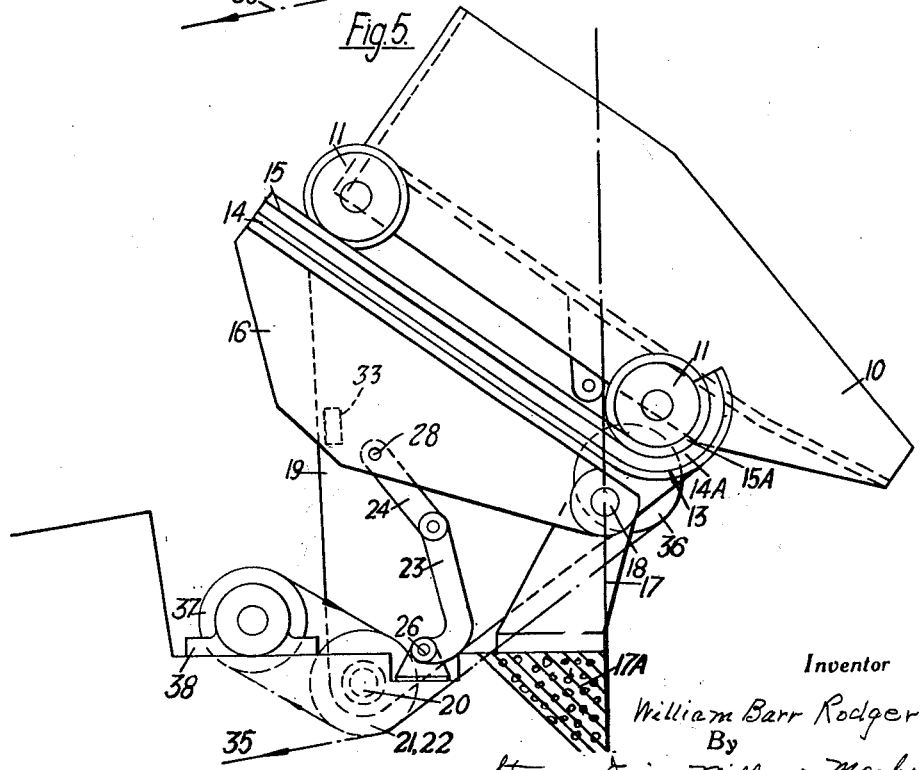
FIG. 5 is a diagrammatic illustration in side elevation showing the skip in full unloading position, the toggle catch means fully extended and the means for tilting the carriage in complete tilting arrangement.

Assuming the skip 10 to have been loaded at the loading position L and the carriage 13 to be in the rest position wherein it is locked with the levers 23, 24 in the relative positions shown in FIG. 2 with the hinge point 25 above and offset relative to the pivot point 28 in the direction of downward slope of the carriage, the winch 39 is started up. The winch 39 pulls in the rope around pulleys 22, 37, 21, 36 and over the jockey pulley 40. The skip 10 travels up the inclined track 12 and, when it reaches the carriage, the striker 34 underslung therefrom strikes the end 30 of the arm 29 projecting into the path of movement of the skip. The arm is therefore moved with the skip thus rotating the toggle catch means in a clockwise direction about pivot 26 until pivot 25 is nearly perpendicular to pivot 28 and releases the carriage for tilting movement about the axle 18, the initial opening of the lock being shown in FIG. 3. The front wheels 11 of the skip 10 at this stage rest against the curved position 15A of the rails 15 of the carriage 13, and the skip is wholly upon and becomes part of the carriage. The pulleys 36 and 21 are thus rendered ineffective. The winch 39, as it continues to turn, takes up the rope 35 between the pulleys 22 and 37 until the carriage is fully tilted (FIG. 5), the pulley 22 during this stage being pulled towards the fixedly located pulley 38 and tilting the carriage 13 progressively in a clockwise direction (as seen in the plane of the drawings) through the medium of the axle 20 and the plates 19. As carriage 13 tilts, pivot 26 remains in situ while pivot 28 follows an arcuate path having as its center axle 18. The rotational force on the carriage during the tilting action is thus proportional to the pull of the winch plus the tension of the rope between pulleys 22 and 37, thereby increasing the mechanical advantage of the tilting action.

When the skip 10 has been discharged, reversal of the winch pulley allows the carriage to return to the rest position and the skip to return along the rails 12 to the loading position L.

The present invention may find many applications, especially in heavy industry such as mining, quarrying and steel-making. One contemplated use is in the disposal of shear crops off ends of billets in the steel-making industry, the shearing mechanism and skip-loading position being so relatively located that the crop ends fall into the skip at the loading position.

I claim:

1. Apparatus for unloading a wheeled skip, said apparatus comprising a carriage having an upper surface, a front end and a rear end, brackets spaced apart transversely of said carriage and below same, at least two plates depending from said carriage and spaced apart transversely of the latter, said plates having openings aligned along an axis extending transversely below said carriage and at said rear end of the latter, an axle passing freely through said openings and secured to said brackets, a track mounted along said upper surface of said carriage, means adapted to tilt said carriage about said axle between a skip-receiving position, wherein said track is aligned with a track along which said skip is adapted to be progressed from a loading position, and a skip-unloading position, wherein said skip is on said carriage track and is adapted to be tilted with said carriage to discharge the skip load, said carriage track being curved upwardly and reversely at said rear end of said carriage to receive the leading wheels of said skip when the latter arrives on said carriage, and toggle catch means locking the carriage in the skip-receiving position and adapted to be tripped by the skip arriving on the carriage to permit tilting of the carriage with the skip thereon in the direction opening the carriage track upwardly away from the skip track about said axis to a skip-discharging position.

2. Apparatus as set forth in claim 1, including a winch and winch rope leading from said winch to a skip-coupling position about a system of pulleys below the carriage, said pulley system being adapted to increase the mechanical advantage of the carriage-tilting action.

3. Apparatus as set forth in claim 2, in which said pulley system comprises twin first and second loose pulleys mounted centrally intermediate said plates, a third loose pulley mounted between said plates and to the winch-remote side of the first and second loose pulleys, and a fourth loose pulley mounted on a fixed abutment to the winch-adjacent side of said first and second loose pulleys, the winch rope passing from the winch successively around the second, fourth, first and third loose pulleys to the skip-coupling position.

References Cited by the Examiner

UNITED STATES PATENTS

| 507,008 | 10/93 | Housinger | 214—104 X |
|---|---|---|---|
| 835,829 | 11/06 | Millard | 214—104 |
| 1,430,655 | 10/22 | Irrgang | 214—713 X |
| 1,466,970 | 9/23 | Starbird | 214—46.22 |
| 1,504,034 | 8/24 | Erwin | 214—128 X |
| 1,539,218 | 5/25 | Stiles | 214—104 |
| 1,565,949 | 12/25 | Morrow | 213—46.22 |
| 1,729,375 | 9/29 | Ellis. | |
| 1,826,490 | 10/31 | Abbe | 214—128 X |
| 2,320,741 | 6/43 | Michael | 22—263 |
| 2,386,410 | 10/45 | Taggart | 214—104 |
| 2,655,276 | 10/53 | Brodeske | 214—103 |
| 2,953,262 | 9/60 | Murphy | 214—46.22 |

FOREIGN PATENTS 302,869 1/18 Germany.
450,504 10/27 Germany.

HUGO O. SCHULZ, *Primary Examiner.*

MORRIS TEMIN, *Examiner.*